United States Patent [19]

Lindman et al.

[11] Patent Number: 4,477,830

[45] Date of Patent: Oct. 16, 1984

[54] PICTURE DISPLAY ARRANGEMENT

[75] Inventors: Nils T. Lindman; Lars H. Fransson; Carl C. Pott, all of Järfälla, Sweden

[73] Assignee: U.S. Philips Corporation, New York, N.Y.

[21] Appl. No.: 434,082

[22] Filed: Oct. 13, 1982

[30] Foreign Application Priority Data

Oct. 14, 1981 [SE] Sweden ................................ 8106091

[51] Int. Cl.³ ................................................ H04N 9/02

[52] U.S. Cl. ...................................... 358/1; 358/21 R; 358/93; 358/183

[58] Field of Search .................... 358/1, 21 R, 93, 160, 358/183

[56] References Cited

U.S. PATENT DOCUMENTS 2,986,596 5/1961 Hammond, Jr. ...................... 358/93
3,387,084 6/1968 Hine et al. ............................ 358/93
3,617,630 11/1971 Reiffel ................................ 358/183

*Primary Examiner*—Richard Murray
*Attorney, Agent, or Firm*—Jack E. Haken; James J. Cannon, Jr.

[57] ABSTRACT

An arrangement for the display of individually selectable map background pictures combined with an overlay of selectable predefined or operator generated symbols. The arrangement comprises a video disc player with a video disc carrying the map pictures and a computer in which symbol generative data of the predefined symbols are stored. A picture generator transforms the symbol generated data into a video signal and a video mixer combines the video signals of a map picture and symbol generative data such that the symbol picture non-transparently covers the map picture. The combined signal is displayed on a color monitor. The video disc allows for rapid access to a large number of maps and the generation of the overlay information requires only a limited computer capacity. The arrangement is specifically useful for rapid and flexible indications of military operations.

6 Claims, 3 Drawing Figures

PICTURE DISPLAY ARRANGEMENT

BACKGROUND OF THE INVENTION

1. Field of the Invention

This invention is directed to an arrangement for the display of individually selectable map pictures as background information combined with overlay information comprising selectable predefined and/or operator generated symbols.

2. Description of the Prior Art

A picture display arrangement of the type indicated above may be used for operational control in military forces and in order to clarify the following description the same has been directed to this application and the problems appearing therewith. At a military formation, data are put together about the positions of one's own forces and enemy targets, fire plans, etc., in order to be used as a basis for decisions during the operation control. Traditionally this putting together of information is carried out manually by drawing symbols of one's own units and enemy targets on a map sheet. Such a method is timeconsuming and inflexible in case it should be necessary to introduce amendments. The risk of making errors when drawing is evident and the surveyability of this form of presentation is limited. In addition the handling of the map sheet itself may give rise to problems when, as is often the case, a number of adjoining map sheets must be used simultaneously.

In a prior art device a map sheet is introduced into a pocket behind a transparent, so called plasma display screen, by means of which symbols may be generated with a desirable position on the map sheet laying behind. A device of this type is an improvement as compared with the purely manual method, but the problem of changing between the map sheets and the handling of the same and the problems which arise when it is necessary to work on the "border" between two or more map sheets are left unsolved. A further problem is to obtain an exact position of the map each time it is used.

In a further prior art device the map picture is generated digitally by means of a computer. The map picture and the symbols are shown on a display screen. The picture surface comprises about 250,000 points and since it is a requirement that the map picture should be shown in color eight bits per point are required in order to obtain a good color reproduction. This means that each picture requires a memory space of about 2 Mbits. With regard to the fact that a number of map pictures, which is comparatively high, should be accessable the requirement on memory capacity is high. For this reason a device of this type will tend to be expensive. In addition the access time when changing between different map pictures will be unavoidably long due to the time used by the computer for building up each map picture.

Summarizing, the drawbacks mentioned above of the prior art devices are of a type which will have to be considered as a hindrance against an optimal use of other advanced equipment used by a modern military force.

SUMMARY OF THE INVENTION

The object of invention is to provide a picture display arrangement of the type defined in the introduction which may replace the manual method described above and in which the drawbacks of the prior art devices have been eliminated.

The object of invention is obtained by a presentation arrangement which according to the invention is characterized in that said arrangement comprises a video disc player with a video disc carrying said map pictures and having means for repeated playback of a selected map picture, a computer having a memory storing map access information of each map picture carried by the disc and also storing symbol generative data of predefined symbols and having an operator input means for the selection of a map picture and a defined symbol, a picture generator for transforming into a video signal the symbol generative data which is supplied from said memory, a video mixer having video signal inputs which are connected to outputs of the video disc player respectively the picture generator and having mixing means for overlaying the RGB-components of the symbol video signal with priority onto the RGB-components of the map video signal such that the symbol picture non-transparently covers the map picture, and a colour monitor for displaying the so combined video signal.

By using a video disc as a memory medium for background information significant advantages are obtained. Accordingly, each side of the video disc has a capacity of about 50,000 pictures, which means that the total number of map sheets of Sweden may be stored on a part of one side of a disc. The display will have a superior quality of reproduction. The access time when changing between different background pictures may be neglected. The position of a map picture on the display screen will be exactly the same each time the map picture is displayed.

A video disc which is intended for reading by means of a laser beam is not fragile and for this reason well suited for active-service conditions. Laser reading of the video disc makes it possible to reproduce one and the same background picture during an unlimited time without any negative influence on quality. The high storage capacity of the video disc makes it possible to store in connection with each picture of a map also picture sequencies showing the real view of different parts of the terrain, for example aerial photographs. Due to the fact that the picture generating function of the computer is restricted to the overlay information of a limited information content, a limited memory space is sufficient for storing the corresponding digital control data of said defined symbols.

Consequently, the combination of a background picture which is carried by a video disc and an overlay picture which is generated by a computer will provide for a display arrangement operating with high speed and having the ability of handling very large amounts of information without putting demands on the computer which are too high as according to the prior art using the computer for generating the full picture information and thereby a favorable cost reduction.

The further features of the display arrangement according to the invention are evident from the following claims.

BRIEF DESCRIPTION OF THE DRAWINGS

The invention will be described with reference to the drawings, in which.

Figure 1:
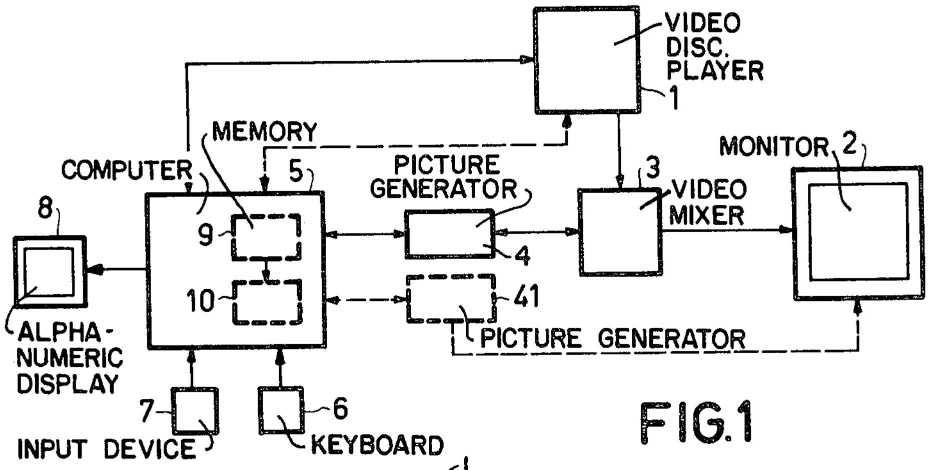
FIG. 1 shows a block diagram of the display arrangement according to the invention.

The display arrangement disclosed in FIG. 1 comprises a video disc player 1, which is preferably of the type using a laser beam for contact-free playback of the video disc. To the video disc player belongs a number of video discs carrying background map pictures. The video disc player and the disc are of a type which allows for repeated playback during an unlimited time of any map picture that has been selected.

The laser video disc may store also complementary information in connection with each map, for example sequencies of aerial photos covering selectable sections of the terrain. Complementary information of this type may comprise moving pictures as well as still pictures.

The video disc player 1 has a control input connected to a computer 5 which is provided with an operator keyboard 6. The operator may select a desired map picture by supplying its code via the keyboard. At the reception of this code the computer 5 instructs the video disc player to playback off the corresponding map picture. A further task of the computer 5 is to provide from a memory the necessary symbol generative data for the generation of symbols which have been ordered via the operator keyboard. The digital symbol information from the computer is supplied as control information to a picture generator 4, which transforms the digital symbol data into a symbol picture video signal.

The video signals from the video disc player 1 and the picture generator 4 are supplied to a video mixer 3 which combines the video signals. The combined video output signal of the mixer 3 is displayed on a color monitor 2.

In the overaly information the positions of different symbols on a map background picture may be adjusted in the vertical and horizontal directions by the use of an input means 7 of the computer. The input means 7 may comprise a joy-stick, a tracker ball or a graphical tablet.

An alternative way of positioning said symbols is by supplying the map picture coordinates of the symbol positions via the keyboard 6 to the computer 5. Using the coordinate information the computer introduces the symbols with their correct positions into the digital symbol picture data.

An alphanumeric display 8 is connected to the computer 5. The display 8 is intended for the presentation of larger amounts of text related to the map picture which is simultaneously displayed on the monitor 2. This text information, which may also comprise tables and different numerical data of interest, is stored in the memory of the computer 5 and may be ordered via the keyboard 6. It is observed that single words like names of targets may be disclosed on the monitor 2 as overlay information.

The drawing of FIG. 1 also indicates an alternative embodiment of the display arrangement. This embodiment uses the transmission lines between the blocks which are shown by broken lines and likewise the alternative blocks included in this embodiment have been indicated by broken lines.

According to this alternative embodiment the combination of said background information and said overlay information is carried out on a digital level. This means that the video disc player 1 functions as a secondary memory of the computer 5. The computer comprises a memory 9 for digital storage of map information from the video disc. If desirable the memory 9 may store temporarily a number of adjoining map pictures. Each map picture may then be combined with its own overlay information, the digital symbol generative data of which is provided by the computer. The so combined digital picture or pictures are transformed into corresponding video signals by means of an alternative picture generator 41 operating on digital input signals. The video signal or video signals which are generated are supplied to the monitor 2, which in case of several different video signals will include a number of separated display screens or, alternatively, one display screen on which the different video signals may be displayed on separated sections of the screen.

The video disc may comprise digitally stored information about the content of a map picture, for example digital information about coordinate system and contour lines. This information is read into memory 9. The contour line information, for example, may be disclosed separately on a display screen on a one-colored background, which may be black or white and which is generated by the computer 5.

Figure 2:
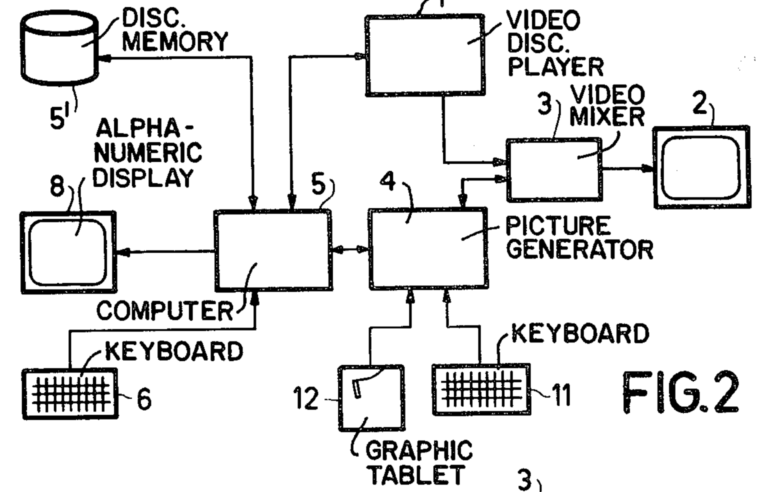
FIG. 2 shows a block diagram of a preferred embodiment of the display arrangement according to the invention.

FIG. 2 shows a preferred embodiment of the picture display arrangement according to the invention. In this embodiment the video disc player comprises a Philips video disc player type VLP 700. The map picture information is stored video discs and on each side of a disc may carry up to 45,000 pictures comprising only maps or if desirable also different picture information related to the maps like arial photos. On the disc the information is recorded as pits of different lengths along tracks in a metal foil. The metal foil is covered by a protecting plastic layer, which means that the play-off will not be disturbed by eventual thumb prints or scratches in the plastic layer. The scanning is obtained by means of a focused laser beam without any mechanical contact between the scanning means and the disc and thereby the disc will not be exposed to effects of wear. As a consequence a player and disc of this type are well suited for use in military active service applications.

The video disc player supplies a standard PAL-video signal. The player may be connected so as to be controlled via a serial asynchronous line according to CCIT V24/V28 from a computer, which will give the same alternatives of control as when using the control panel of the player. The instructions which are supplied from the computer 5 are acknowledged by the player, which means that the computer may retransmit an instruction if the first transmission was not correctly interpreted.

For the recording of the maps in this embodiment map-scales of 1:50,000, 1:250,000 and 1:500,000 have been used. Each map of each scale has been recorded in two different enlargements. From this follows that each map picture carried by the disc corresponds to only a selected portion of the original map and consequently the recording has been made with a great overlap between the different map pictures. For example the picture center of the pictures have a covering area of $3\times4$ km has been moved between different pictures in steps of 1 km in both the X- and Y-directions.

In the memory of the computer 5 each map picture is defined by a map access information comprising the picture number, the position of the picture center and the covering area, in order for the computer to select the adequate picture when display of a given area is requested by the operator.

The computer 5 comprises a Philips minicomputer of type P 857E. The computer comprises the following operative units:

a central processor unit CPU which is a microprogrammed 16 bits minicomputer which is built around so called bitslice circuits, a semiconductor primary memory of the CPU having the capacity of 96 kwords, a secondary memory 5' realized by a disc memory of Philips type 1216 and having one fixed and one exchangeable disc with each a storage capacity of 5,4 Mbytes, interfaces for the alphanumeric display 8 and the video disc record player 1 which are asynchronous and serial according to CCITT V24/V28, an interface for the picture generator 4 which is a two-way 16 bits parallel interface having a maximum data rate of 800 kwords/s.

The picture generator is a RAMTEK 9400. The picture generator transforms the digital overlay information obtained from the computer 5 and from a so called graphic tablet 12 (see below) which is connected to the picture generator. The picture generator is of a raster-scan-type. The picture is divided into 512 lines each including 640 points. The picture generator may store information of each point with regard to color and luminance. Sixteen combinations of color/luminance from a color scale of 256 colors may be defined per point. The output of the picture generator consists of the RGB signals of the generated picture. The picture generator may generate the RGB signals of two color monitors disclosing independent pictures.

The input means 12 which is connected to the picture generator 4 comprises a graphic tablet type Summapraphic BIT PAD ONE. By means of this tablet an operator can make drawings on and point at the map picture which is displayed on the screen. The graphical tablets allows a geographical positioning of the defined symbols which are generated by the computer just by pointing at the desirable position by means of the pen of the graphic tablet. The position instruction from the graphic tablet is transferred to the computer 5. Another possibility is to create on-line overlay information for immediate use or storage in the computer memory for later use.

The picture generator 4 is also provided with a separate keyboard 11. By means of keyboard 11 and graphic tablet 12 the display arrangement may be instructed to display a map area which has been indicated by means of the graphic tablet's pen and with an enlargement which has been selected via the keyboard 11. In this case the instructions obtained from the graphical tablet 12 and the keyboard 11 are transferred to the computer 5, which transforms the instructions into a corresponding map access information, which in turn is supplied to the video disc player 1.

Also in this embodiment the computer 5 is provided with an ordinary keyboard 6 which is a Philips alphanumeric keyboard type PTS 6272. By means of this keyboard a desirable map may be selected from the video disc player 1. Information on different targets may supplied to the computer 5 for storage in memory 5' and the corresponding type of information may be requested for display on the display 8 realized by a Philips alphanumeric display type PTS 6346. In the same manner different types of tables and technical information may be supplied to the arrangement and requested therefrom.

The video mixer 3 is used for combining the PAL-video signal from the video disc player with the RGB-signals supplied by the picture generator 4, and for this purpose the video mixer has the following functions: transformation of the PAL-signal from the video disc player into corresponding RGB-components; mixing of the video signals on RGB-level with a priority for the RGB-signals from the picture generator, which means that the synthetic information from the picture generator is laid over the map information and is not transparent, but on the contrary the map picture is visible at a point where the synthetic picture is black; extraction of the synchronizing pulses from the PAL-signal of the field respectively line changes in order to be used for control of the picture generator.

Mixing of the video signals on the RGB-level gives the advantage that the synthetic overlay information may be generated with contours of a sufficient sharpness. Mixing of the signals on the video signal level instead should give unusefully vague contours of red symbols in the first place due to the narrow red band width of the ordinary PAL-video signal.

The color monitor 2 is a Philips color monitor type LDH 6200 which accepts the RGB-video signals.

Figure 3:
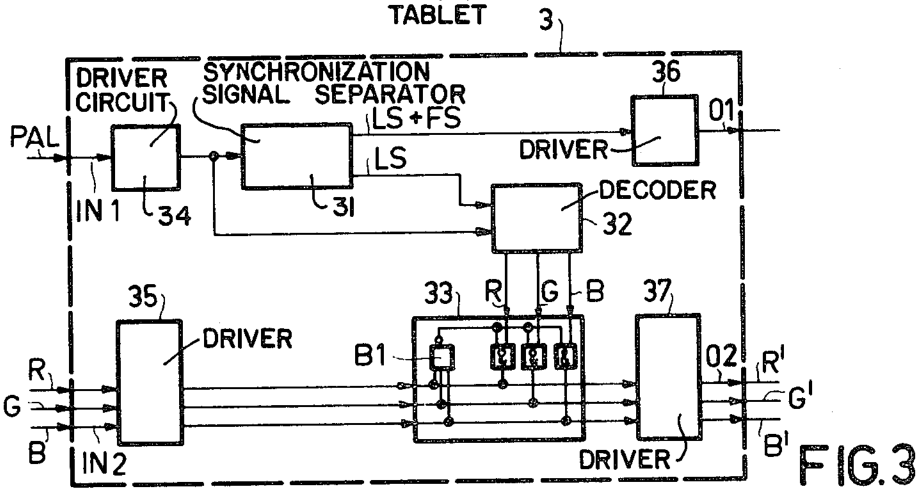
FIG. 3 shows a detailed block diagram of the video mixer of the embodiment which is disclosed in FIG. 2.

FIG. 3 shows a detailed block diagram of the video mixer 3 disclosed in FIG. 2. A first input IN1 is supplied with the video signal from the video disc record, which in this embodiment is a PAL-video signal. Via an input driver circuit 34 this video signal is transferred to a synchronization signal separator 31, which separates the line and field synchronization signals LS+FS from the PAL-video signal. Via an output driver circuit 36 and an output 01 the line and field synchronization signals are transferred to a control input of the picture generator 4 for controlling the generation of the RGB-components of the symbol overlay picture.

Via a second output of the separator 31 the line synchronization signal LS is supplied to a control input of a color decoder 32. A signal input of the decoder 32 is supplied with the PAL-video signal. On three outputs the color decoder 32 generates the RGB-components of the PAL-video signal. The decoder 32 is a color decoder of the type which is commonly used in TV-sets. The RGB-components are supplied to three inputs of a mixer circuit 33.

Via a second input IN2 and an input driver circuit 35 the RGB-components from the picture generator 4 are supplied to three further inputs of the mixer circuit. The mixer circuit 33 is made to combine the two sets of RGB-components in such a manner that the RGB-components of a picture point of the symbol video signal will always replace the RGB-components of the corresponding picture point in the map video signal. As a consequence the symbol picture non-transparently covers the map picture when displayed on the monitor 2.

The circuits performing said replacement have been illustrated in the Figure by an NOR-gate to the three inputs of which the symbol picture RGB-components are supplied. The output of the NOR-gate is supplied to a first input of three separate AND-gates to the second inputs of which the respective map picture RGB-components are supplied. The output of each AND-gate is connected to a transmission line carrying the corresponding color components of the symbol picture. The so combined component signals R'G'B' appear on an output 02 of the video mixer 3 via an output driver circuit 37.

What is claimed is:

1. An arrangement for the display of individually selectable map pictures as background information combined with overlay information comprising selectable predefined and/or operator generated symbols, characterized in that said arrangement comprise:

a video disc player with a video disc carrying said map pictures and having means for repeated playback of a selected map picture;

a computer having a memory storing map access information of each map picture and storing symbol generative data of said predefined symbols, and an operator input means for the selection of a map picture and a defined symbol;

a picture generator for transforming into a video signal the symbol generative data which is supplied from said memory;

a video mixer having video signal inputs which are connected to outputs of the video disc player and the picture generator and having mixing means for overlaying RGB-components of symbol video signals with priority onto RGB-components of map video signals such that the symbol picture non-transparently covers the map picture; and means for displaying the so combined video signal.

2. An arrangement as claimed in claim 1, characterized in that a graphic tablet is connected to an input of said picture generator, said graphic tablet comprising a graphic board and a pen connected thereto by means of which an operator may introduce graphic overlay information on line into a map picture which is disclosed on the monitor or into the memory of the computer for display at a later occasion.

3. An arrangement as claimed in claim 1 or 2, characterized in that an alphanumeric display is provided for disclosing text and numerical information related to the disclosure on the monitor, said information being stored in the memory of the computer and being selectable by means of the operator input means of the computer.

4. An arrangement as claimed in claim 3 in which said video disc player is of a type using a focused laser beam for contract-free optical reading of a video disc comprising a metallic foil holding trackwise arranged pits of different lengths as carriers of recorded information, characterized in that the pits of a first track are carriers of a complete map background picture, and that the pits of second tracks are carriers of regularly overlapping map pictures and define different scales of the one and same map picture.

5. An arrangement as claimed in claims 1 or 2, characterized in that said video mixer comprises:

a synchronization signal separator for separating the line and field synchronization signals from the video signal supplied from the video disc player, said line and field synchronization signals being transferred to a control input of the picture generator;

a color decoder for transforming the video disc player's video signal into its RGB-components and having an input to which said video signal is supplied, a control signal input to said line synchronization signal is supplied, and an RGB-signal output; and a mixer circuit including a control means which is made to generate an output signal whenever the signal level of at least one of the picture generator's RGB-components of a given scanning line picture point is above zero, and a switching means for switching-off the rGB-components obtained from said color decoder dependent on said control signal, and a signal combination means for combining the picture generator's RGB-components and the switched color decoder's RGB-components.

6. A picture display arrangement as claimed in claims 1 or 2 for the display of overlay information comprising operator generated symbols on the background of a map picture, said arrangement comprising:

a video disc player using a focused laser beam for scanning of an optically readable video disc carrying said map pictures and having means for repeated playback of a selected map picture;

a computer having a memory storing for each map, map access information including a map picture number, the position of the map picture center and the covering area of the map picture, and storing symbol generative data of defined military symbols, and an operator keyboard for the selection of a map picture and a defined symbol;

a picture generator for transforming into a video signal the symbol generative data which is supplied from said memory;

a video mixer having video signal inputs which are connected to outputs of the video disc player and the picture generator and having mixing means for overlaying the RGB-components of the symbol video signal with priority into the RGB-components of the map video signal such that the symbol picture non-transparently covers the map picture; and a color monitor for displaying the combined video signal.

* * * * *